(12) United States Patent
Brunnett

(10) Patent No.: US 6,646,823 B1
(45) Date of Patent: Nov. 11, 2003

(54) DISK DRIVE USING OFFSET DATA SECTORS

(75) Inventor: Don Brunnett, Pleasanton, CA (US)

(73) Assignee: Maxtor Corporation, Longmont, CO (US)

( * ) Notice: Subject to any disclaimer, the term of this patent is extended or adjusted under 35 U.S.C. 154(b) by 344 days.

(21) Appl. No.: 09/590,047

(22) Filed: Jun. 8, 2000

(51) Int. Cl.[7] .................... G11B 5/09; G11B 21/02; G11B 5/596
(52) U.S. Cl. .................... 360/48; 360/75; 360/77.02
(58) Field of Search .................... 360/48, 75, 77.02

(56) References Cited

U.S. PATENT DOCUMENTS 5,751,512 A * 5/1998 Anderson ............... 360/78.04
6,320,718 B1 * 11/2001 Bouwkamp et al. ...... 360/77.04

* cited by examiner

*Primary Examiner*—Regina N. Holder
(74) *Attorney, Agent, or Firm*—Tejpal S. Hansra

(57) ABSTRACT

A disk drive stores data within a single track of a data storage disk at two different lateral positions with respect to the track centerline. The radial distance between the two lateral positions is preferably equal to the lateral offset between the read and write elements of a corresponding dual element transducer for the particular track. In a preferred approach, some of the data sectors within selected tracks are designated to be offset sectors. Data is written to these sectors at the offset position rather than the standard write position for the disk drive. Data can then be moved within a single track of the disk drive without having to perform a microjog operation by reading from a data sector in the standard location and then writing to an offset sector location.

24 Claims, 4 Drawing Sheets

DISK DRIVE USING OFFSET DATA SECTORS

FIELD OF THE INVENTION

The invention relates generally to data storage systems and, more particularly, to disk based data storage systems.

BACKGROUND OF THE INVENTION

A disk drive uses a transducer to write data to and read data from the tracks of a data storage disk. Traditionally, transducers have included a single read/write element for performing both read and write operations on a disk surface. More recently, dual element transducers that include separate elements for performing read and write operations have become popular. For example, a common dual element head arrangement includes a magneto-resistive (MR) read element and an inductive write element within a single transducer package. Other dual element transducer configurations are also possible.

Dual element transducers typically have a lateral offset between the read and write elements of the transducer when the transducer is positioned above a target track. The lateral offset is usually the result of both the physical geometry of the transducer and the skew angle caused by the rotary actuator. Because the skew angle changes from track to track, the lateral offset for the transducer generally changes as the transducer is moved across the disk surface. Because of the lateral offset between the read and write elements, microjogging is generally used during read and/or write operations to accurately position a corresponding element of the transducer with respect to the track. Without microjogging, the disk drive servo controller acts to center the read element of the transducer about the track centerline. Microjogging is used to move the transducer a small lateral distance away from this centered read element position to appropriately align the head for performing a data transfer operation. For example, if data is to be written in a centered position on the track, microjogging is used to position the head so that the write element is centered about the track centerline. This requires a microjog distance equal to the lateral offset between the read and write elements. Microjogging is typically performed by injecting an offset value into a track following servo control loop.

There are many instances during disk drive operation when it is desirable to move data from one portion of a track to another portion of the same track. For example, this may be required when performing functions such as reassign verification, error recovery, background flaw scanning, and power safe operations (e.g., a power safe read/modify/write operation). Traditionally, the movement of data within a single track was performed by (1) positioning the transducer in a "read" position above the desired track, (2) reading the data to be moved from the original location on the track, (3) microjogging the transducer to a "write" position above the track, and then (4) writing the data to the new location on the track. However, because the microjog operation took a finite amount of time to perform, the transducer was commonly past the beginning of the new location on the track by the time the microjog was complete. Thus, a full revolution of the disk was required before the write operation could be performed. As can be appreciated, this revolution of the disk takes time and degrades the overall performance of the drive.

Therefore, there is a need for a method and apparatus for moving data within a single track of a disk that is more efficient the past techniques. Preferably, the method and apparatus will reduce or eliminate the need to wait for a full revolution of the disk before data can be written to the track of the disk.

SUMMARY OF THE INVENTION

The present invention relates to a disk drive system that is capable of efficiently moving data from one location to another within a single track of a data storage disk. To accomplish this, the system stores user data at multiple different offset positions within a single track. That is, some of the data sectors stored within a track are written at a standard lateral write position within the track and others are written in a position that is offset from the standard position. In one embodiment, for example, some of the data sectors in a track are written in a centered position on the track while others are written at a predetermined off-track position. Preferably, the lateral distance between the standard write position and the offset position is equal to the lateral offset between the read and write elements of the dual element transducer for that particular track. Thus, data can be read from one portion of the track and then written to another portion of the track (i.e., an offset location) without performing a microjog operation. Because the microjog does not have to be performed, there is no delay in performing the subsequent write operation and a wasted revolution of the disk is rarely, if ever, required.

DETAILED DESCRIPTION OF A PREFERRED EMBODIMENT

Figure 1:
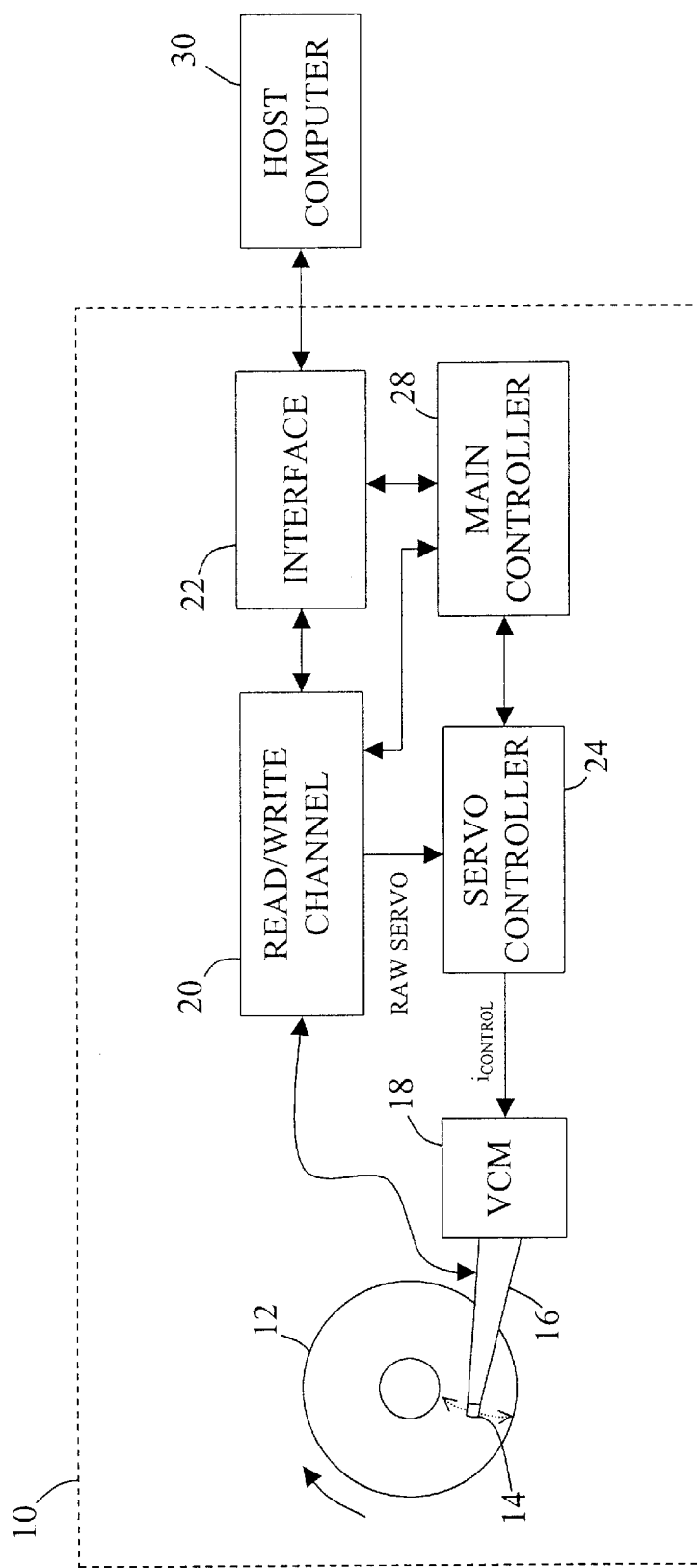
FIG. 1 is a block diagram illustrating a disk drive that can utilize the principles of the present invention.

The present invention relates to a disk drive system that is capable of efficiently moving data from one location to another within the same track of a data storage disk. FIG. 1 is a block diagram illustrating a disk drive 10 that can utilize the principles of the present invention. Before the inventive principles are discussed, a brief description of the operation of the disk drive 10 will me made. As illustrated, the disk drive 10 is coupled to an external host computer 30 that uses the disk drive 10 as a mass storage device. The disk drive 10 includes: a data storage disk 12, a transducer 14, an actuator arm 16, a voice coil motor (VCM) 18, a read/write channel 20, an interface unit 22, a servo controller 24, and a main disk drive controller 28. It should be appreciated that the blocks illustrated in FIG. 1 are functional in nature and do not necessarily represent discrete hardware elements. For example, in one approach, two or more of the functional blocks within the disk drive 10 are implemented in software within a common digital processor.

The disk drive 10 receives read and/or write requests from the host computer 30 and carries out the requests by performing data transfers between the disk 12 and the host 30. The interface unit 22 is operative for providing an interface between the disk drive 10 and the host computer 30. During read and write operations, the interface unit 22 provides a communications path, including data buffering functions, between the host computer 30 and the read/write channel 20. In addition, the interface unit 22 is operative for receiving commands and requests from the host computer 30 and directing them to the main controller 28. The main controller 28 then carries out the commands by appropriately controlling the elements within the disk drive 10.

The read/write channel 20 is operative for, among other things, performing the data transformations necessary to provide communication between the host computer 30 and the disk 12. For example, during a write operation, the read/write channel 20 converts digital data received from the host computer 30 into an analog write current for delivery to the transducer 14. During a read operation, the read/write channel 20 provides the data transformations necessary for converting an analog read signal received from the transducer 14 into a digital representation that can be recognized by the host computer 30. The read/write channel 20 is also operative for separating out servo information read by the transducer 14 and for directing this servo information to the servo controller 24 for use in positioning the transducer 14.

The voice coil motor (VCM) 18 is operative for controllably positioning the transducer 14 with respect to disk 12 in response to a control signal (e.g., $i_{control}$) generated by the servo controller 24. When performing a read or write operation, the main controller 28 instructs the servo controller 24 to move the transducer 14 to a target track on the disk 12 so that a data transfer can take place. The servo controller 24 then generates a control signal to move the transducer 14 from a present location to the indicated target track in a process known as a "seek" operation. Once the transducer 14 has arrived at the target track, the servo controller 24 enters a "track follow" mode during which the transducer 14 is maintained in a desired position above the target track. The bulk of the data transfer between the transducer 14 and the target track occurs during this track follow mode.

In a preferred embodiment, the disk drive 10 includes multiple disks 12 in a vertical stack arrangement with one transducer 14 for each operative disk surface. Typically, both surfaces of each disk 12 will be operative for storing user data and, therefore, the disk drive 10 will include two transducers 14 for each disk 12. The transducers 14 are all coupled to a single integrated actuator arm assembly 16 so that the transducers are substantially vertically aligned with one another through the stack and move together under the influence of the VCM 18. Other disk configurations, such as single disk arrangements and single-sided disk arrangements, can also be used in accordance with the present invention.

Figure 2:
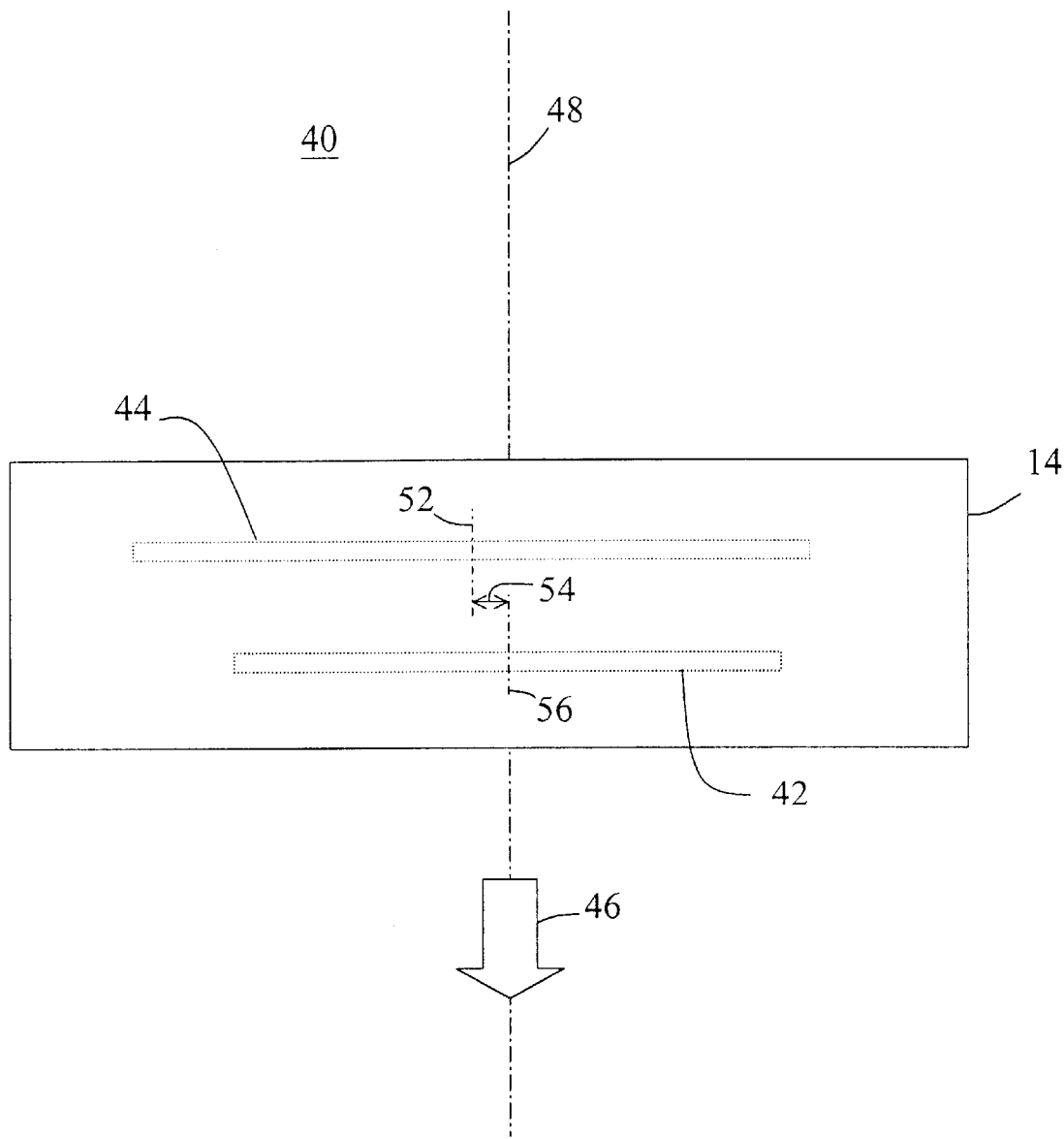
FIG. 2 is a simplified top view illustrating a dual element transducer in accordance with one embodiment of the present invention.

FIG. 2 is a simplified top view illustrating a dual element transducer 14 in accordance with one embodiment of the present invention. As illustrated, the dual element transducer 14 is located above a data track 40 that is traveling in a direction 46 with respect to the transducer 14. The data track 40 has a centerline 48 that is defined by servo information on the disk (e.g., servo bursts within a corresponding servo sector). The dual element transducer 14 includes a read element 42 having a centerline 56 and a write element 44 having a centerline 52. As illustrated, there is a lateral offset 54 between the read element 42 and the write element 44 with respect to the track 40. As can be appreciated, the magnitude of the lateral offset 54 between the elements would be different if the skew angle between the transducer 14 and the track 40 were different.

It is generally desirable that the read element 42 be centered above the written data when performing a read operation. Thus, a technique known as microjogging is used to compensate for the lateral offset between the read element 42 and the write element 44 during read and/or write operations. In microjogging, a small offset value is injected into the servo control loop during track following operations to move the transducer 14 a small distance in the lateral direction with respect to the track 40 to properly position the read element 42 and/or the write element 44. Without microjogging, the servo controller 24 would nominally center the read element 42 about the track centerline 48 based on servo data read from the servo regions of the disk. Microjogging is used to move the read element 42 from this nominally centered position when appropriate. For example, the transducer 14 can be microjogged so that the write element 44 is centered about the centerline 48 during a write operation. On a subsequent read operation involving the same data, no microjogging is necessary because the written data is centered. Alternatively, both read and write microjogs can be performed to each compensate for a portion of the lateral offset between the elements.

In accordance with the present invention, data is written at multiple different lateral positions within a single track. That is, some of the data sectors on a track are nominally written at a first lateral position on the track (with respect to the track centerline) and other data sectors are nominally written at a second lateral position on the track that is different from the first. In addition, the distance between the second lateral position and the first lateral position is preferably equal to the lateral offset between the read and write elements of the corresponding transducer for the given track. Thus, when moving data within a single track, a data block can be read from one sector of the track (e.g., at the first lateral position) and then written to another sector of the same track (e.g., at the second lateral position) without performing a microjog.

As used herein, the terms "nominal" and "nominally" are meant to designate a commanded or desired position at which to write data. It should be appreciated, however, that transducer positioning errors will occur during normal disk drive operation that will often prevent the transducer from maintaining a commanded (i.e., nominal) position exactly. The transducer will normally be maintained within a small window about the commanded position.

Figure 3:
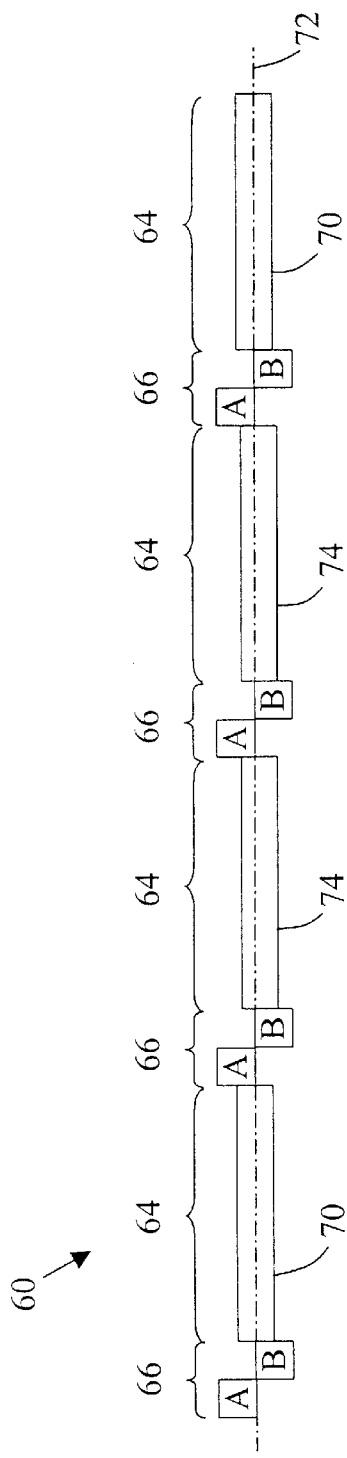
FIG. 3 is a diagram illustrating a data configuration within a track of a data storage disk in accordance with one embodiment of the present invention.

FIG. 3 is a diagram illustrating a data track 60 having a centerline 72 in accordance with one embodiment of the present invention. As illustrated, the track 60 includes a plurality of data regions 64 and a plurality of servo regions 66. The servo regions 66 are operative for storing overhead data that is used for, among other things, transducer positioning. For ease of illustration, the servo regions 66 are shown as including only A and B servo bursts. However, in practice, the servo regions 66 will include other servo information in addition to this servo burst information. The data regions 64 are operative for storing user data. Typically, this data is stored in equal length blocks within the data regions 64. In one convention, the region between each successive pair of servo regions 66 is referred to as a hard sector and the region that is used to store a single block of user data is referred to as a soft sector. Each hard sector can be used to store any number of soft sectors, including fractional numbers. The soft sector locations are generally determined during the disk drive design phase. In the embodiment of FIG. 3, each hard sector corresponds to a single soft sector. Many other arrangements are possible.

As illustrated in FIG. 3, the track 60 includes some data sectors 70 that are laterally centered about the corresponding track centerline 72 and some data sectors 74 that are laterally offset from the track centerline 72. In the preferred embodiment, the offset data sectors 74 are offset from the centered data sectors 70 by the lateral offset distance between the read and write elements of the transducer for the corresponding track 60. The A and B servo bursts are aligned along the track centerline 72 and are used by the disk drive to position the transducer 14 on the track 60 in a known manner.

In accordance with one aspect of the invention, the data configuration illustrated in FIG. 3 is used to move data from one location on the track 60 to another location on the track 60 without the need for performing a microjog operation. First, the read element 42 of the transducer 14 is centered on the track using the A and B servo bursts. Next, data is read from one of the data sectors 70 on the track using the read element 42. The data is then written to one of the offset data sectors 74 on the track using the write element 44 of the transducer 14. Because the offset data sectors 74 are offset from the other data sectors 70 by the lateral offset distance between the read and write elements, no microjogging is necessary before the data can be written to the track. Thus, the data can be immediately written when the transducer reaches the offset data sector location and the disk drive doesn't have to wait for a full revolution of the disk to write the data.

Figure 4:
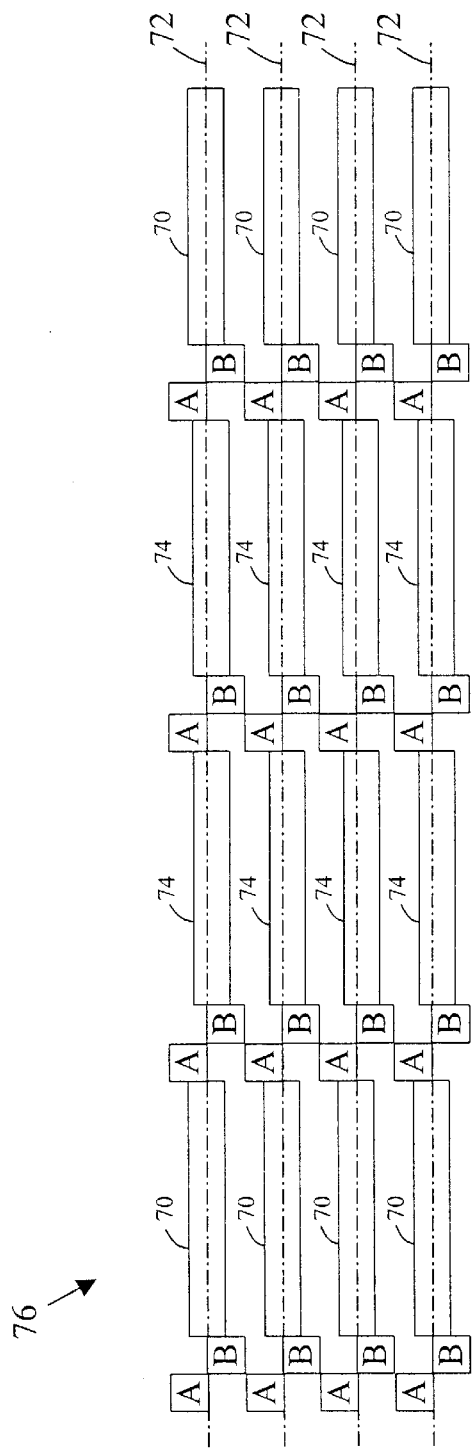
FIG. 4 is a diagram illustrating a multi-track data configuration in accordance with one embodiment of the present invention.

FIG. 4 illustrates a multiple-track data configuration 76 in accordance with one embodiment of the present invention. As shown, each of the tracks of the multiple-track data configuration 76 uses the same track configuration illustrated in FIG. 3. In addition, the offset sectors 74 in each of the tracks are radially aligned with one another across the track boundaries. This geometry significantly reduces the occurrence of adjacent track data corruption in the disk drive.

Figure 5:
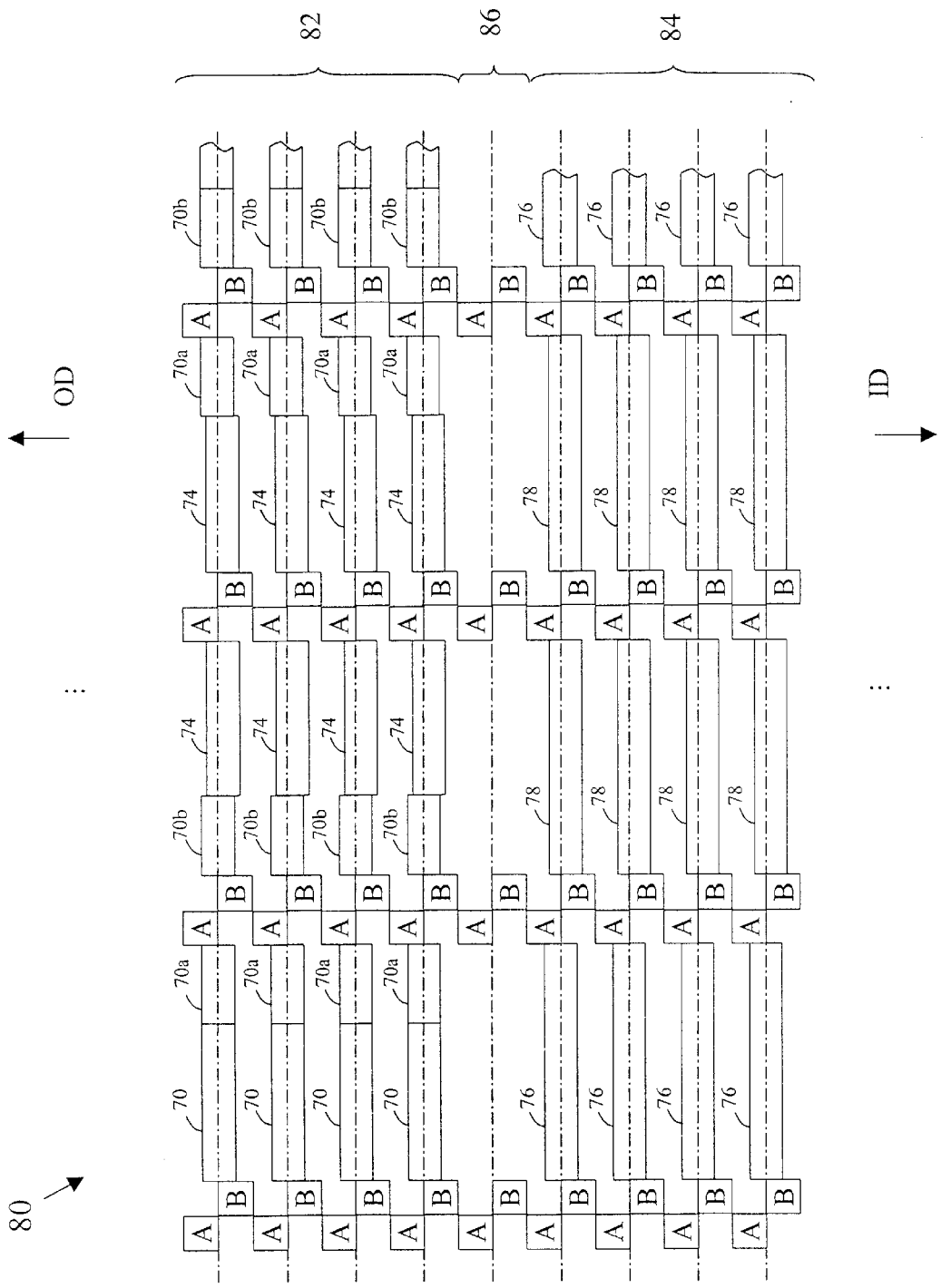
FIG. 5 is a diagram illustrating a multi-zone data configuration in accordance with one embodiment of the present invention.

FIG. 5 is a diagram illustrating a multiple-zone data configuration 80 in accordance with one embodiment of the present invention. As shown, the data configuration 80 includes a first zone 82 and a second zone 84 that each include multiple tracks. The tracks within each of the zones 82, 84 each store data in equal capacity soft sectors within corresponding hard sectors. However, because the tracks within zone 82 are closer to the outer diameter of the disk, and hence have a greater physical length, a greater number of soft sectors occur within each hard sector of these tracks (i.e., 1.5 soft sectors) than occur within the hard sectors of the tracks in zone 84 (i.e., 1 soft sector). In addition, some of the soft sectors within the first zone 82 are divided between two different hard sectors in a technique known as split data sector (e.g., see soft sectors 70 a,b).

As illustrated in FIG. 5, the data tracks in both zones 82, 84 include some centered data sectors and some offset data sectors. For example, the tracks within zone 82 include centered data sectors 70 and offset data sectors 74. Similarly, the tracks within zone 84 include centered data sectors 76 and offset data sectors 78. The offset sectors within each zone 82, 84 are radially aligned with one another as described above to prevent adjacent track data corruption. However, because of the zoned configuration, the offset sectors 74 within the first zone 82 are not radially aligned with the offset sectors 78 in the second zone 84. Therefore, to prevent the occurrence of adjacent track data corruption between the zones, at least one track 86 is left blank between the zones 82, 84. This same technique can be utilized between each adjacent zone pair in the drive.

In a preferred embodiment of the invention, the main controller 28 (see FIG. 1) keeps track of the sectors within the disk drive that are laterally offset from the other sectors. The controller 28 then uses these sectors to write data when performing single track data transfers. The offset sectors can also be used to store data during normal disk drive operations as long as the appropriate microjog value (if any) is used during the corresponding write operation. That is, the read offset value (if any) must be used during a write operation involving an offset data sector. To read data that is written within an offset sector, a microjog operation needs to be performed that moves the transducer 14 to a position where the read element of the transducer is centered above the offset data.

The number of offset sectors that occur within a particular track will depend upon the specific function to be performed using the offset sectors. Typically, the number of offset sectors will be significantly less than the number of non-offset sectors. In addition, offset sectors can be provided on all of the tracks on a disk or only some of the tracks depending on the particular function being performed.

In the embodiments illustrated in FIGS. 3–5, some of the data sectors are nominally centered on the corresponding tracks while others are offset from the centered position. It should be appreciated that embodiments also exist where some of the sectors are laterally offset from the track centerline by a first distance and other sectors are laterally offset from the track centerline by a different distance. In such embodiments, the lateral distance between the two offset locations is preferably equal to the lateral offset between the read and write elements of the transducer 14 for the corresponding track.

Although the present invention has been described in conjunction with its preferred embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A disk drive comprising:

a data storage disk having a plurality of substantially concentric tracks for use in storing user data, said plurality of substantially concentric tracks including a first track having a first track centerline, said first track having a first portion and a second portion;

a transducer for use in writing user data to said data storage disk;

an actuator assembly coupled to said transducer for use in positioning said transducer relative to said data storage disk, said actuator assembly including an actuator arm and a motor unit; and a controller for controlling the writing of user data to said data storage disk using said transducer and said actuator assembly, said controller writing user data to said first portion of said first track at a first nominal offset distance from said first track centerline and said controller writing user data to said second portion of said first track at a second nominal offset distance from said first track centerline, wherein said second nominal offset distance is different from said first nominal offset distance.

2. The disk drive claimed in claim 1 wherein:

said transducer includes both a read element and a separate write element, said read element and said write element being laterally offset from one another with respect to said first track by a lateral offset distance, wherein said first nominal offset distance and said second nominal offset distance are related to said lateral offset distance between said read element and said write element.

3. The disk drive claimed in claim 2 wherein:

said first nominal offset distance is zero and said second nominal offset distance is equal to said lateral offset distance between said read element and said write element.

4. The disk drive claimed in claim 1 wherein:

said first track is divided into a plurality of individual data sectors; and said first and second portions of said first track each include at least one data sector.

5. The disk drive claimed in claim 1 wherein:

said plurality of substantially concentric tracks includes a second track having a second track centerline, said second track having a first portion and a second portion, wherein said first portion of said second track is radially aligned with said first portion of said first track and said second portion of said second track is radially aligned with said second portion of said first track, said controller writing user data to said first portion of said second track at said first nominal offset distance from said second track centerline and said controller writing user data to said second portion of said second track at said second nominal offset distance from said second track centerline.

6. The disk drive claimed in claim 5 wherein:

said data storage disk includes a number of different zones, each of said zones including tracks that store user data at a different angular density from other zones on said data storage disk, wherein said first and second track are within a common zone.

7. A disk drive comprising:

a data storage disk having a plurality of substantially concentric tracks for use in storing digital data, each of said plurality of substantially concentric tracks being divided into a plurality of individual data sectors, said plurality of substantially concentric tracks including a first track having a first track centerline;

a transducer for use in writing user data to said data storage disk;

an actuator assembly coupled to said transducer for use in positioning said transducer relative to said data storage disk, said actuator assembly including an actuator arm and a motor unit; and a controller for controlling the writing of digital data to said data storage disk using said transducer and said actuator assembly, said controller being configured to write user data to a first set of data sectors within said first track at a first lateral position with respect to said first track centerline and said controller being configured to write user data to a second set of data sectors within said first track at a second lateral position with respect to said first track centerline, wherein said second lateral position is different from said first lateral position.

8. The disk drive claimed in claim 7 wherein:

said second set of data sectors includes a single data sector.

9. The disk drive claimed in claim 7 wherein:

said controller is configured to write user data to said first set of data sectors in a centered position about said first track centerline and said controller is configured to write user data to said second set of data sectors in a non-centered position about said first track centerline.

10. The disk drive claimed in claim 7 wherein:

said transducer includes both a read element and a write element, said read element and said write element being laterally offset from one another with respect to said first track by a lateral offset distance, wherein a distance between said first and second lateral positions is equal to said lateral offset distance.

11. The disk drive claimed in claim 7 wherein:

said data storage disk includes a plurality of zones that each include a number of tracks, said plurality of zones including a first zone having a first group of tracks, each track in said first group of tracks having a first set of data sectors and a second set of data sectors, wherein said first set of data sectors in each of said first group of tracks is radially aligned with said first set of data sectors in each other of said first group of tracks and said second set of data sectors in each of said first group of tracks is radially aligned with said second set of data sectors in each other of said first group of tracks;

wherein said controller is configured to write user data to said second set of data sectors within each of said first group of tracks at a different lateral position with respect to a corresponding track centerline than data is written to a corresponding first set of data sectors.

12. The disk drive claimed in claim 11 wherein:

said plurality of radial zones includes a second zone having a second group of tracks, each track in said second group of tracks having a third set of data sectors and a fourth set of data sectors, wherein said third set of data sectors in each of said second group of tracks is radially aligned with said third set of data sectors in each other of said second group of tracks disk and said fourth set of data sectors in each of said second group of tracks is radially aligned with said fourth set of data sectors in each other of said second group of tracks, wherein said third and fourth sets of data sectors within said second group of tracks are not radially aligned with said first and second sets of data sectors within said first group of tracks;

wherein said controller is configured to write user data to said fourth set of data sectors within each of said second group of tracks at a different lateral position with respect to a corresponding track centerline than data is written to a corresponding third set of data sectors.

13. A method for use in storing user data to a data storage disk within a disk drive, said data storage disk having a plurality of data storage tracks for use is storing user data, said plurality of data storage tracks including a first track having a first track centerline, said first track being divided into at least a first and second portion, said method comprising the steps of:

writing first data to said first portion of said first track, said first data being written to said first portion a first nominal offset distance from the first track centerline; and writing second data to said second portion of said first track, said second data being written to said second portion a second nominal offset distance from said first track centerline, wherein said second nominal offset distance is different from said first nominal offset distance.

14. The method claimed in claim 13, wherein:

said first nominal offset distance is zero.

15. The method claimed in claim 14, wherein:

said second nominal offset distance is equal to a lateral offset between a read element and a write element within a transducer in the disk drive with respect to said first track.

16. A computer readable medium having program instructions stored thereon for implementing the method of claim 13.

17. A method for use in storing digital data within a disk drive, comprising the steps of:

moving a transducer from a present location above a data storage disk to a target track of the data storage disk, said transducer including both a read element and a write element, said read element and said write element being laterally offset from one another with respect to said target track by a first lateral offset distance;

reading first user data from said target track using said read element of said transducer while said read element is maintained at a first nominal position with respect to the centerline of said target track; and writing said first user data to said target track, after said reading step, using said write element of said transducer while said read element is maintained at said first nominal position with respect to the centerline of said target track.

18. The method claimed in claim 17 wherein:

said target track includes a first data storage region and a second data storage region, said first data storage region being different from said second data storage region, wherein said reading step includes reading said first user data from said first data storage region and said writing step includes writing said first user data to said second data storage region.

19. The method claimed in claim 18 wherein:

said first data storage region includes a first data sector on said target track and said second data storage region includes a second data sector on said target track.

20. The method claimed in claim 18 wherein:

said second data storage region has been designated to store data at a nominal offset position that is different from a standard offset position used within the disk drive.

21. The method claimed in claim 17 wherein:

said target track includes user data written at two different nominal offset positions.

22. The method claimed in claim 17 wherein:

said first nominal position includes a read offset position.

23. The method claimed in claim 17 wherein:

said first nominal position is a position where said read element is nominally centered about said centerline of said target track so that, during said writing step, said first data is written off-track by said first lateral offset distance of said transducer.

24. A computer readable medium having program instructions stored thereon for implementing the method claimed in claim 17.

* * * * *